US008869560B2

(12) United States Patent
Dannoux et al.

(10) Patent No.: US 8,869,560 B2
(45) Date of Patent: Oct. 28, 2014

(54) PROCESS AND SYSTEM FOR PRECISION GLASS SHEET BENDING

(71) Applicant: Corning Incorporated, Corning, NY (US)

(72) Inventors: Thierry Luc Alain Dannoux, Avon (FR); Allan Mark Fredholm, Vulaines sur Seine (FR); Laurent Joubaud, Paris (FR); Sophie Peschiera, Veneux les Sablons (FR); Stephane Poissy, Brunoy (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/044,317

(22) Filed: Oct. 2, 2013

(65) Prior Publication Data

US 2014/0026621 A1    Jan. 30, 2014

Related U.S. Application Data

(62) Division of application No. 13/303,685, filed on Nov. 23, 2011, now Pat. No. 8,549,885.

(51) Int. Cl.
| | | |
|---|---|---|
| *C03B 11/06* | (2006.01) | |
| *C03B 23/023* | (2006.01) | |
| *C03B 23/025* | (2006.01) | |
| *C03B 35/20* | (2006.01) | |

(52) U.S. Cl.
CPC ........... *C03B 23/023* (2013.01); *C03B 23/0256* (2013.01); *C03B 23/0258* (2013.01); *C03B 35/202* (2013.01)

USPC ............................................................ 65/106

(58) Field of Classification Search
USPC .................... 65/106, 107, 359, 273, 289–291
See application file for complete search history.

(56) References Cited

U.S. PATENT DOCUMENTS

| | | | | |
|---|---|---|---|---|
| 4,286,980 | A | | 9/1981 | Matsuzaki et al. ............... 65/106 |
| 4,488,893 | A | * | 12/1984 | Claassen et al. ................. 65/287 |
| 4,626,267 | A | * | 12/1986 | Reese et al. ...................... 65/106 |
| 4,804,397 | A | * | 2/1989 | Stas et al. ......................... 65/107 |
| 5,049,178 | A | * | 9/1991 | Pereman et al. ................. 65/106 |
| 5,090,989 | A | * | 2/1992 | Adoline ........................... 65/273 |

(Continued)

FOREIGN PATENT DOCUMENTS

| | | | |
|---|---|---|---|
| FR | 2651771 | 3/1991 | ............. C03B 23/03 |
| JP | S63-21229 | 1/1988 | ............. C03B 23/025 |
| JP | H11-322353 | 11/1999 | ............. C03B 20/00 |

OTHER PUBLICATIONS

International Search Report and Written Opinion dated Apr. 25, 2013, International Application No. PCT/US2012/064948.

*Primary Examiner* — Jason L Lazorcik
(74) *Attorney, Agent, or Firm* — Ryan T. Hardee

(57) ABSTRACT

An apparatus and method for precision bending a glass sheet that includes an oven for heating the glass sheet to a temperature near the softening temperature of the glass sheet. A stage for supporting the glass sheet. A pair of reference surfaces on the stage for precisely locating the glass sheet on the stage. At least one bending mechanism on a pair of arms inside the oven for bending an edge portion of the glass sheet. Inward facing first stop surfaces on the arms that contact reference surfaces on the stage for precisely locating the bending mechanism on the arms relative to the stage and the glass sheet.

10 Claims, 8 Drawing Sheets

(56) References Cited

U.S. PATENT DOCUMENTS

| | | | |
|---|---|---|---|
| 5,093,177 A | 3/1992 | Anderson et al. | 428/81 |
| 5,167,689 A | 12/1992 | Weber | 65/105 |
| 5,437,703 A * | 8/1995 | Jacques et al. | 65/106 |
| 5,849,057 A * | 12/1998 | Didelot | 65/106 |
| 6,076,373 A * | 6/2000 | Grodziski | 65/107 |
| 6,158,247 A * | 12/2000 | Didelot | 65/106 |
| 6,240,746 B1 | 6/2001 | Maeda et al. | 65/29.11 |
| 7,401,476 B2 * | 7/2008 | Fukami et al. | 65/106 |
| 8,156,764 B2 * | 4/2012 | Machura et al. | 65/290 |
| 8,281,619 B2 * | 10/2012 | Dannoux | 65/106 |
| 8,336,334 B2 * | 12/2012 | Ross et al. | 65/107 |
| 8,397,540 B2 * | 3/2013 | Dannoux et al. | 65/291 |
| 8,429,937 B2 * | 4/2013 | Malach et al. | 65/107 |
| 2010/0229602 A1 * | 9/2010 | Ross et al. | 65/107 |
| 2010/0300152 A1 * | 12/2010 | Dannoux | 65/66 |
| 2011/0067450 A1 * | 3/2011 | Fredholm et al. | 65/81 |
| 2011/0072856 A1 * | 3/2011 | Davidson et al. | 65/61 |
| 2011/0126588 A1 * | 6/2011 | Malach et al. | 65/30.1 |
| 2011/0148267 A1 * | 6/2011 | McDaniel et al. | 312/404 |
| 2011/0265517 A1 * | 11/2011 | Keebler et al. | 65/30.13 |
| 2012/0131961 A1 * | 5/2012 | Dannoux et al. | 65/103 |
| 2012/0279257 A1 * | 11/2012 | Dannoux et al. | 65/103 |
| 2013/0086948 A1 * | 4/2013 | Bisson et al. | 65/106 |

* cited by examiner

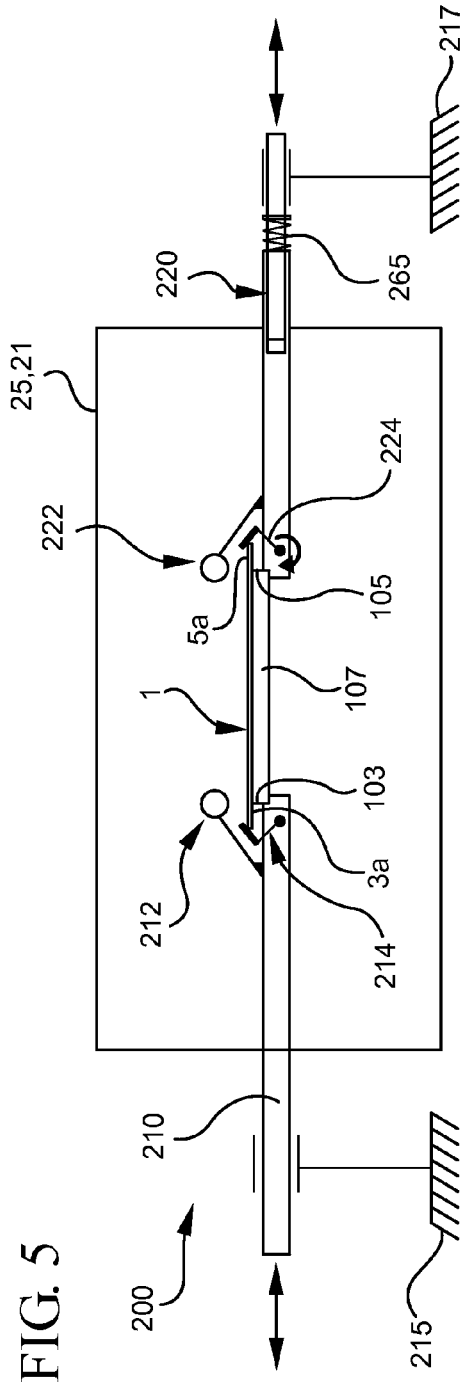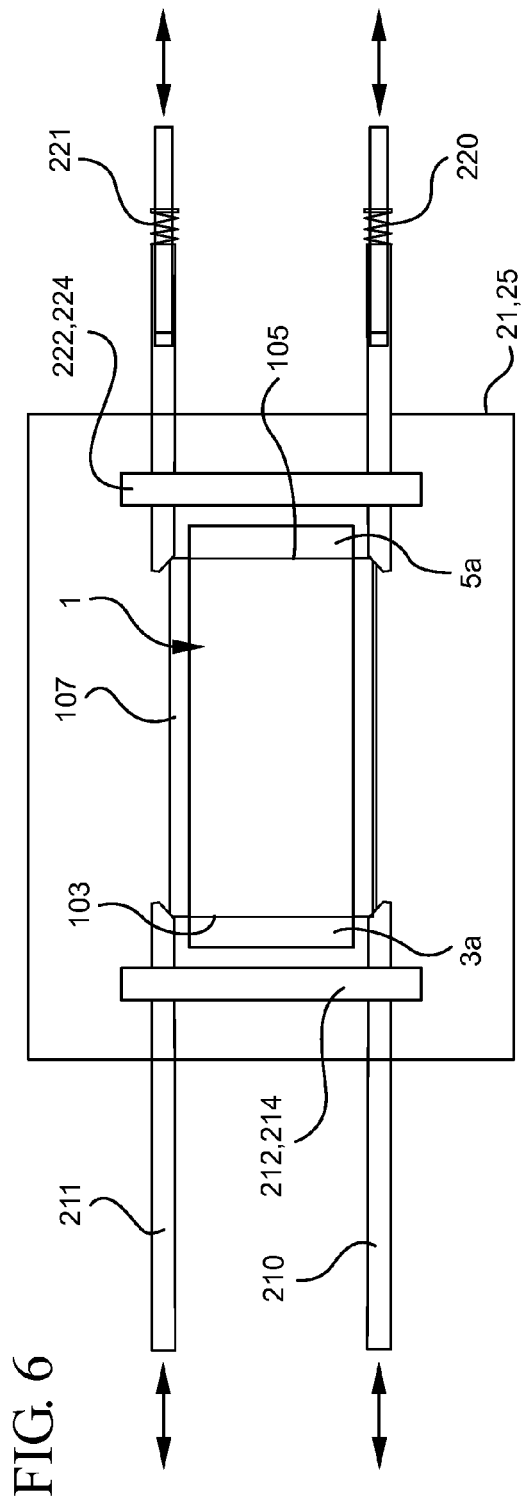

PROCESS AND SYSTEM FOR PRECISION GLASS SHEET BENDING

CROSS-REFERENCE TO RELATED APPLICATIONS

This application is a divisional application of and claims the priority benefit of U.S. patent application Ser. No. 13/303,685, filed on Nov. 23, 2011, the content of which being relied upon and incorporated herein by reference in its entirety.

BACKGROUND

The field of the invention is a device for supporting and accurately positioning a large area glass sheet for high precision bending of the glass sheet, and more particularly for localized, high temperature, high precision bending of opposing edge portions of a large area glass sheet having a relatively high coefficient of thermal expansion (CTE).

Electronic devices often include a protective cover glass that provides impact and scratch resistance to the front, display or touch control portion of the device. Electronic devices, such as cell phones (and other portable devices), LCD flat panel televisions and, household appliances are trending toward edge to edge transparent front covers that provide a clean, glossy, seamless and/or frameless design.

No admission is made that any reference cited herein constitutes prior art. Applicant expressly reserves the right to challenge the accuracy and pertinency of any cited documents.

SUMMARY

The invention relies on the design and use of a non deformable carrier supporting a large glass sheet in a perfectly known geometrical reference at room temperature and while heating the glass sheet to a high glass reforming or bending temperature (processing temperature). The carrier offers a low thermal expansion and an essentially inelastic mechanical support in the 20-750° C. range enabling the carrier to provide a non-deformable bearing surface. The carrier also includes registration surfaces at registration points on the carrier for precisely aligning the glass sheet on the carrier that are known all over the reforming thermal cycle. The carrier also presents interfaces with edge bending mechanisms for providing precise local registration of the bending mechanisms. The carrier may include a metallic frame for engaging with a bending apparatus conveying system and a non-deformable plate or mold for supporting and molding the glass sheet. The mold may be made of various materials, such as glass ceramic or Silicon Carbide, that have a low thermal expansion and are essentially inelastic in the 20° C. to 750° C. range.

One embodiment of the disclosure relates to an apparatus for precisely bending a glass sheet. The apparatus includes an oven for heating the glass sheet to a temperature near or greater than the annealing temperature of the glass sheet. A stage having a top support surface for supporting a sheet of glass, a first edge, an opposing second edge, and a pair of outward facing first reference surfaces on the first edge of the stage adjacent to ends of the first edge of the stage. A pair of first arms having inner ends extending into the oven from a first side of the oven, a first bending mechanism mounted on the inner ends of the first pair of arms inside the oven for bending a first edge portion of a glass sheet on the stage down over the first edge of the stage, and an inward facing first stop surface provided near the inner end of each of the first arms in opposition to the pair of first reference surfaces. A pair of second arms having inner ends extending into the oven from a second side of the oven, and an inward facing second stop surface provided near the inner end of each of the second arms in opposition to the second edge of the stage. A first moving mechanism for moving the pair of first arms inward toward and outward away from the first edge of the stage. Whereby when the stage is located in the oven with a glass sheet to be bent supported on the support surface of stage with a first edge portion of the glass sheet to be bent extending beyond the first edge of the stage, the first arms are moved inward toward the stage and the second arms are moved inward toward the stage until the first stop surfaces contact the first reference surfaces and the second stop surfaces contact the second edge of the stage, whereby the stage is held between the first stop surfaces and the second stop surfaces with the first edge of stage and the first edge of the glass sheet is precisely located relative to and aligned with the first bending mechanism.

Other embodiments of the disclosure relate to such an apparatus as further including a lift arm on the inner ends of each of the first arms and the second arms that extend inward from the first and second stop surfaces. Whereby when the first arms are moved inward toward the stage and the second arms are moved inward toward the stage, the lift arms engage an under-side of the stage and lift the stage such that the stage is resting on the lift arms and the stage is free to translate and rotate on the lift arms, whereby as the first stop surfaces contact the first reference surfaces and the second stop surfaces contact the second edge of the stage translates and rotates on the lift arms until all of the first stop surfaces are contacting the first reference surfaces and all of the second stop surfaces are contacting the second edge of the stage, whereby the first edge of the stage and the first edge of the glass sheet are precisely located relative to and aligned with the first bending mechanism.

Other embodiments of the disclosure relate to such an apparatus further including pair of outward facing second reference surfaces on the second edge of the stage adjacent to ends of the second edge of the stage and second bending mechanism mounted on the inner ends of the second pair of arms inside the oven. Whereby when the stage is located in the oven with a glass sheet to be bent supported on the support surface of stage with a first edge portion of the glass sheet to be bent extending beyond a first edge of the stage and a second edge portion of the glass sheet to be bent extending beyond the second edge of the stage, the first arms are moved inward toward the stage and the second arms are moved inward toward the stage until the first stop surfaces contact the first reference surfaces and the second stop surfaces contact the second reference surfaces, whereby the stage is held between the first stop surfaces and the second stop surfaces with the first edge of stage and the first edge of the glass sheet precisely located relative to and aligned with the first bending mechanism and the second edge of stage and the second edge of the glass sheet precisely located relative to and aligned with the second bending mechanism.

Other embodiments of the disclosure relate to such an apparatus wherein at least one of the pair of first arms and the pair of second arms are spring loaded and the first arms and second arms are moved inward until the spring load arms are compressed and apply pressure on the edge of the stage.

Other embodiments of the disclosure relate to such an apparatus wherein the stage further comprises a third edge extending between the first edge of the stage and the second edge of the stage, a first registration element extending upward form the support surface of the stage adjacent to the third edge of the stage, and a second registration element extending upward from the support surface of the stage adjacent to the third edge of the stage. The first registration element and the second registration element being located on the stage to define a reference line oriented at a desired orientation with respect to the first edge of the stage. Whereby when a glass sheet having a first edge portion to be bent is located on the support surface with a reference edge of the glass sheet extending from the first edge in contact with both the first registration element and the second registration element, the first edge portion of the glass sheet is aligned with the first edge of the stage.

Other embodiments of the disclosure relate to such an apparatus wherein the stage further comprises a clamp mounted adjacent to the third edge of the stage, the clamp having a clamp surface for clamping a glass sheet in place on the support surface. Whereby when the glass sheet is located on the support surface with the reference edge of the glass sheet in contact with both the first registration element and the second registration element and a reference point on the glass sheet is aligned with and clamped in place on the stage by the clamp surface, the glass sheet is precisely located and secured in place on the stage with the first edge portion of the glass sheet aligned with and extending a first desired distance beyond the first edge of the stage.

Other embodiments of the disclosure relate to such an apparatus wherein the clamp surface is formed of two or more separate contact surfaces.

Other embodiments of the disclosure relate to such an apparatus further including a pair of outward facing second reference surfaces on the second edge of the stage adjacent to each end of the second edge of the stage, and a second bending mechanism mounted on the inner ends of the second pair of arms inside the oven. Whereby when the glass sheet is located on the support surface with the reference edge of the glass sheet in contact with both the first registration element and the second registration element and a reference point on the glass sheet is aligned with and clamped in place on the stage by the clamp surface, the glass sheet is precisely located and secured in place on the stage with the first edge portion of the glass sheet aligned with and extending a first desired distance beyond the first edge of the stage and the second edge portion of the glass sheet aligned with and extending a second desired distance beyond the second edge of the stage; and whereby when the first arms are moved inward toward the stage and the second arms are moved inward toward the stage until the first stop surfaces contact the first reference surfaces and the second stop surfaces contact the second reference surfaces, the stage is held between the first stop surfaces and the second stop surfaces with the first edge of stage and the first edge of the glass sheet is precisely located relative to and aligned with the first bending mechanism and second edge of stage and the second edge of the glass sheet is precisely located relative to and aligned with the second bending mechanism.

Other embodiments of the disclosure relate to such an apparatus wherein the first bending mechanism and second bending mechanism each include a biasing apparatus for pushing and bend the corresponding first edge portion of the glass sheet and the second first edge portion of the glass sheet down over a corresponding one of the first edge of the stage and a second edge of the stage.

Other embodiments of the disclosure relate to such an apparatus wherein the first bending mechanism and second bending mechanism each include a local heating apparatus for heating the corresponding first edge portion of the glass sheet and the second edge portion of the glass sheet to a temperature near the softening temperature of the glass sheet, such as a temperature between the annealing temperature and the softening temperature of the glass.

Other embodiments of the disclosure relate to such an apparatus wherein the first bending mechanism and second bending mechanism each include a local heating apparatus for heating the corresponding first edge portion of the glass sheet and the second edge portion of the glass sheet to a temperature near the softening temperature of the glass sheet, such as a temperature between the annealing temperature and the softening temperature of the glass.

Other embodiments of the disclosure relate to such an apparatus further including a lift arm on the inner ends of each of the first arms and the second arms that extend inward from the first and second stop surfaces. Whereby when the first arms are moved inward toward the stage and the second arms are moved inward toward the stage, the lift arms engage an under-side of the stage and lift the stage such that the stage is resting on the lift arms and the stage is free to translate and rotate on the lift arms, whereby as the first stop surfaces contact the first reference surfaces and the second stop surfaces contact the second reference surfaces the stage translates and rotates on the lift arms until all of the first stop surfaces are contacting the first reference surfaces and all of the second stop surfaces are contacting the second reference surfaces, whereby the first edge of the stage and the first edge of the glass sheet are precisely located relative to and aligned with the first bending mechanism and the second edge of the stage and the second edge of the glass sheet are precisely located relative to and aligned with the second bending mechanism.

Other embodiments of the disclosure relate to a method of precisely bending at least one edge portion of a glass sheet including the steps of: locating a glass sheet on a support surface of a stage having a first edge and an opposing second edge, with a first edge portion of the glass sheet extending beyond the first edge of the stage, the first edge of the stage having pair of spaced outward facing first reference surfaces; providing an elongate first bending mechanism inside the oven for bending a first edge portion of a glass sheet on the stage down over the first edge of the stage, the bending mechanism having a pair of spaced inward facing first stop surfaces in opposition to the pair of first reference surfaces; providing a pair of spaced inward facing first stop surfaces in opposition to the second edge of the stage; locating the stage with the glass sheet supported thereon in a bending oven and heating the glass sheet to a temperature between the annealing temperature and the softening temperature of the glass sheet; and moving the first bending mechanism and moving the second stop surfaces inward toward the stage until the first stop surfaces contact the first reference surfaces and the second stop surfaces contact the second edge of the stage, whereby the stage is held between the first stop surfaces and the second stop surfaces with the first edge of stage and the first edge portion of the glass sheet is precisely located relative to and aligned with the first bending mechanism.

Other embodiments of the disclosure relate to such a method further including the steps of: providing pair of spaced first lift arms extending inward from the first heating device and a pair of spaced second lift arms extending inward from the second stop surfaces; and moving the first bending mechanism and moving the second stop surfaces inward toward the stage until the first stop surfaces contact the first reference surfaces and the second stop surfaces contact the second edge of the stage, whereby the lift arms engage an under-side of the stage and lift the stage such that the stage is resting on the lift arms and the stage is free to translate and rotate on the lift arms, whereby as the first stop surfaces contact the first reference surfaces and the second stop surfaces contact the second edge of the stage translates and rotates on the lift arms until all of the first stop surfaces are contacting the first reference surfaces and all of the second stop surfaces are contacting the second edge of the stage, whereby the first edge of the stage and the first edge of the glass sheet are precisely located relative to and aligned with the first bending mechanism.

Other embodiments of the disclosure relate to such a method further including the steps of: locating a glass sheet on a support surface of a stage having a first edge and an opposing second edge, with a first edge portion of the glass sheet extending beyond the first edge of the stage and a second edge portion of the glass sheet extending beyond the second edge of the stage, the first edge of the stage having pair of spaced outward facing first reference surfaces and the second edge of the stage having pair of spaced outward facing second reference surfaces; providing an elongate second bending mechanism inside the oven for bending a second edge portion of a glass sheet on the stage down over the second edge of the stage, the second stop surfaces being located on the second bending mechanism; and moving the first bending mechanism and second bending mechanism inward toward the stage until the first stop surfaces contact the first reference surfaces and the second stop surfaces contact the second reference surfaces, whereby the stage is held between the first stop surfaces and the second stop surfaces with the first edge of stage and the first edge portion of the glass sheet precisely located relative to and aligned with the first bending mechanism, and the second edge of stage and the second edge portion of the glass sheet precisely located relative to and aligned with the second bending mechanism.

Other embodiments of the disclosure relate to such a method wherein the stage further comprises a third edge extending between the first edge of the stage and the second edge of the stage. Providing a first registration point and a second registration point on the stage adjacent to the third edge of the stage, such that registration point and a second registration point define a reference line oriented at a desired orientation with respect to the first edge of the stage whereby. Locating the glass sheet on the stage with a reference edge of the glass sheet aligned with both the registration point and the second registration point, whereby the first edge portion of the glass sheet is aligned with the first edge of the stage.

Other embodiments of the disclosure relate to such a method further including the steps of: providing a third registration point on the stage; locating the glass sheet on the stage with a reference edge of the glass sheet aligned with both the first registration point and the second registration point, and the reference point of the glass aligned with the third registration point on the glass, whereby, the glass sheet is precisely located and secured in place on the stage with the first edge portion of the glass sheet aligned with and extending a first desired distance beyond the first edge of the stage and the second edge portion of the glass sheet aligned with and extending a second desired distance beyond the second edge of the stage; and clamping the glass against the stage at the third reference point.

Other embodiments of the disclosure relate to such a method wherein the first bending mechanism and second bending mechanism each include a biasing apparatus for pushing and bending the corresponding first edge portion of the glass sheet and the second edge portion of the glass sheet down over a corresponding one of the first edge of the stage and a second edge of the stage.

Other embodiments of the disclosure relate to such a method the first bending mechanism and second bending mechanism each include a local heating apparatus for heating the corresponding first edge portion of the glass sheet and the second edge portion of the glass sheet to a temperature near the softening temperature of the glass sheet, such as a temperature between the annealing temperature and the softening temperature of the glass.

Other embodiments of the disclosure relate to such a method wherein the first bending mechanism and second bending mechanism each include a local heating apparatus for heating the corresponding first edge portion of the glass sheet and the second edge portion of the glass sheet to a temperature near the softening temperature of the glass sheet, such as a temperature between the annealing temperature and the softening temperature of the glass.

Other embodiments of the disclosure relate to such a method further including the steps of: providing pair of spaced first lift arms extending inward from the first heating device and a pair of spaced second lift arms extending inward from the second heating device; and moving the first bending mechanism and moving the second bending mechanism inward toward the stage until the first stop surfaces contact the first reference surfaces and the second stop surfaces contact the second edge of the stage, whereby the lift arms engage an under-side of the stage and lift the stage such that the stage is resting on the lift arms and the stage is free to translate and rotate on the lift arms, whereby as the first stop surfaces contact the first reference surfaces and the second stop surfaces contact the second edge of the stage translates and rotates on the lift arms until all of the first stop surfaces are contacting the first reference surfaces and all of the second stop surfaces are contacting the second edge of the stage, whereby the first edge of the stage and the first edge of the glass sheet are precisely located relative to and aligned with the first bending mechanism and the second edge of the stage and the second edge of the glass sheet are precisely located relative to and aligned with the second bending mechanism.

Other embodiments include a method or system for bending a glass sheet in which the glass sheet being bent meets the following criteria: $CTE \times D \times \Delta T \geq 2 \times ST$, where CTE is the coefficient of thermal expansion of the glass sheet, D is the largest dimension of the glass sheet, $\Delta T$ is the change in temperature of the glass sheet during bending of the glass sheet, and ST is the specified tolerance for the bent glass sheet.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 is an explanatory schematic side view of the registration carrier in the bending zone of the bending oven;

FIG. 6 is an explanatory schematic plan view of the registration carrier in the bending zone of the bending oven;

DETAILED DESCRIPTION

Figure 1:
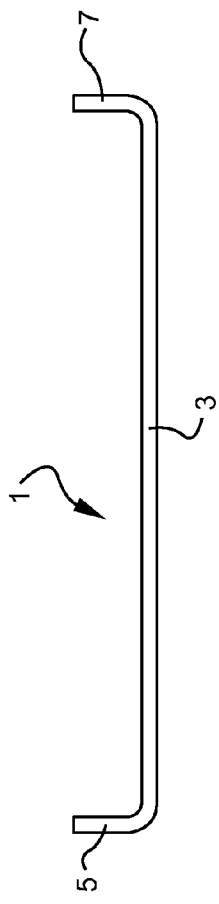
FIG. 1 is a schematic edge view of a bent sheet of glass (not drawn to scale) according to an embodiment hereof.

FIG. 1 is schematic illustration (not drawn to scale) of an embodiment of a formed or shaped glass article 1 that may be used as a glass cover or fascia for an electronic device or architectural component. Such a glass cover (or cover glass) 1 may be shaped, such as by molding, bending or sagging, such that it has rearward extending side portions 3 and 5 a generally planar central front panel portion 7 and. The central, side and inner portions of the glass fascia may be substantially flat/planar in configuration, or may be slightly curved/bowed or otherwise shaped.

Glass covers for devices with electronic displays or touch controls are increasingly being formed of thin glass that has been chemically strengthened using an ion exchange process, such as Gorilla® glass from Corning Incorporated, in order to provide a thin, lightweight glass cover with enhanced fracture and scratch resistance, as well as enhanced optical and touch performance for these devices. Ion exchangeable glasses typically have a relatively higher CTE than non-ion exchangeable process. Ion exchangeable glasses may, for example, have a high CTE in the order of $70 \times 10^{-7}$ $C^{-1}$ to $90 \times 10^{-7}$ $C^{-1}$. The thin glass sheets may have a thickness of up to about 1.5 mm, up to about 1 mm, up to about 0.7 mm, or in a range of from about 0.5 mm to about 1.5 mm, or from about 0.5 mm to about 0.7.

Assembly tolerances in the order of +/−0.5 mm or less are often required to provide the desired quality look, feel, fit and finish for an electronic or other device. Such tolerances are difficult to achieve when performing high temperature, localized, high precision bending of relatively high CTE or relatively large glass sheets, e.g. a sheets having a dimension of over 1 m, of ion exchangeable glass. When heating a relatively large glass sheet or a relatively high CTE glass sheet to a temperature that softens the glass to the point that it can be bent or formed to the desired shape, the sheet of glass may expand by as much as 10 mm in one or more directions. This expansion of the glass creates challenges in maintaining high precision tolerances when heating and bending the glass sheet. The relationship between the size, CTE and high precision tolerances for a bent/formed glass may be expressed by multiplying the CTE of the glass sheet, the largest dimension D of the glass sheet and the change in temperature $\Delta T$ during bending/forming of the glass sheet ($CTE \times D \times \Delta T$). When $CTE \times D \times \Delta T$ is larger than 2 or more, or 4 or more times the specified tolerance ST for the bent/formed glass sheet ($CTE \times D \times \Delta T \geq 2 \times ST$), then precision forming such a glass sheet without a device or process as described herein will be a challenge. After bending the ion exchangeable glass to the correct shape, the glass is ion exchanged to provide the desired chemical strengthening or tempering of the glass sheet.

The present invention provides a solution for precision shaping of large glass sheets, particularly relatively large sheets of relatively high CTE glass, using a localized high temperature bending processes, and more particularly relatively thin, relatively, relatively high CTE sheets. However, it will be appreciated that a precision carrier and positioning device as described herein may be employed in single zone heating glass bending processes that heats the entire glass sheet to a substantially uniform temperature for bending, as well as in localized heating glass bending process that heat just the portions of the glass sheet being bent to a temperature near the softening temperature of the glass, such as a temperature between the annealing temperature and the softening temperature of the glass.

Terms such as "rearward" or "downward" are used for convenience of description in this description and the appended claims and should not be interpreted as requiring a certain orientation of the glass sheet, other elements, or direction of bending of the glass.

The term "relatively large" or "large" as used in this description and the appended claims in relation to a glass sheet means a glass sheet having a dimension of 1 meter or more on at least one direction.

The term "relatively high CTE" or "high CTE" as used in this description and the appended claims in relation to a glass or a glass sheet means a glass or glass sheet having a CTE of at least $70 \times 10^{-7}$ $C^{-1}$.

The term "relatively thin" or "thin" as used in this description and the appended claims in relation to a glass sheet means a glass sheet having a thickness of up to about 1 mm, up to about 0.7 mm, or in a range of from about 0.5 mm to about 1 mm, or from about 0.5 mm to about 0.7 mm.

In order to locally bend or form a flat glass sheet into a desired shape, the glass sheet is typically supported on a frame or mold. The glass sheet and the mold are then placed in a bending furnace and the furnace is heated to a temperature between the annealing temperature and the softening temperature of the glass. The glass sheet may then be allowed to sag, e.g. deform to the shape of the mold under its own weight, or a force may be applied to the glass sheet to aid in the deformation of the glass sheet. The glass sheet is then cooled and removed from the furnace, and the glass sheet is removed from the mold.

Figure 2:
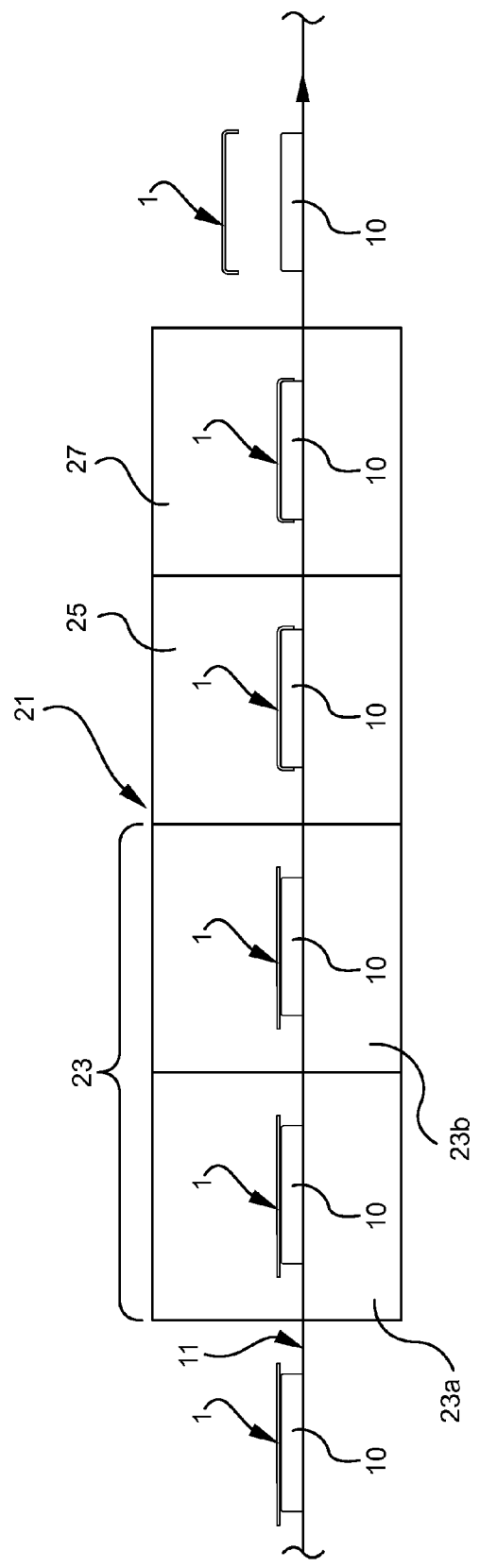
FIG. 2 is a schematic side view of a conveyor and bending oven according to an embodiment hereof.

As schematically illustrated in FIG. 2, in order to form a plurality of glass sheets 1 in a continuous fashion, a plurality of molds 10 may be located on continuously moving conveyor 11 for conveying a plurality of glass sheets 1 placed on the molds through an elongate bending furnace 21 in a serial fashion. Glass sheets are loaded onto the molds at room temperature upstream from the furnace. The furnace may have a plurality of zones of different temperatures. The first of these zones is a preheating zone 23, in which the glass sheets are heated to a temperature close to the annealing temperature of the glass. The preheating zone may be comprised of a plurality of pre-heating zones 23a, 23b, etc. of increasing temperature for slowly heating the glass sheets. The next zone is a bending zone 25, where the glass sheets are brought to a processing or bending temperature, such as a temperature between the annealing temperature and the softening temperature of the glass, for example, a temperature of about 600° C. The bending zone 25 is long enough to provide the glass sheets sufficient time to gradually bend by gravity until it assumes the shape of the frame. Alternatively, a force may be applied to the edge portions of the glass sheets to more rapidly bend the glass sheets 1. The glass sheets are then cooled in a cooling zone 27 to room temperature and exit the output end of the tunnel furnace. The glass sheets may alternatively be cooled in the air, eliminating the need for the cooling zone in the bending oven. The formed and cooled glass sheets 1 are then removed from the molds 10 downstream from the oven.

In order to precisely form the bent portions 3 and 5 of a glass sheet 1 to high tolerances, the glass sheet 1 must be precisely positioned on the molds 10 and must remain precisely positioned throughout the pre-heating and bending process. As previously described, when heating a relatively large or a relatively high CTE sheet of glass to the bending or processing temperature, for example, a temperature of a at least 600° C., the sheet may expand by as much as 10 mm in one or more directions. As the glass sheet expands during heating, the sheet is likely to shift one way or the other on the mold 10. As a result of this shifting, the glass sheet 1 may no longer be precisely positioned on the mold 10 and will not be precisely shaped to the desired shape, such a, for example, a precisely, symmetrically bent sheet of glass 1 as illustrated in FIG. 1.

Figure 3:
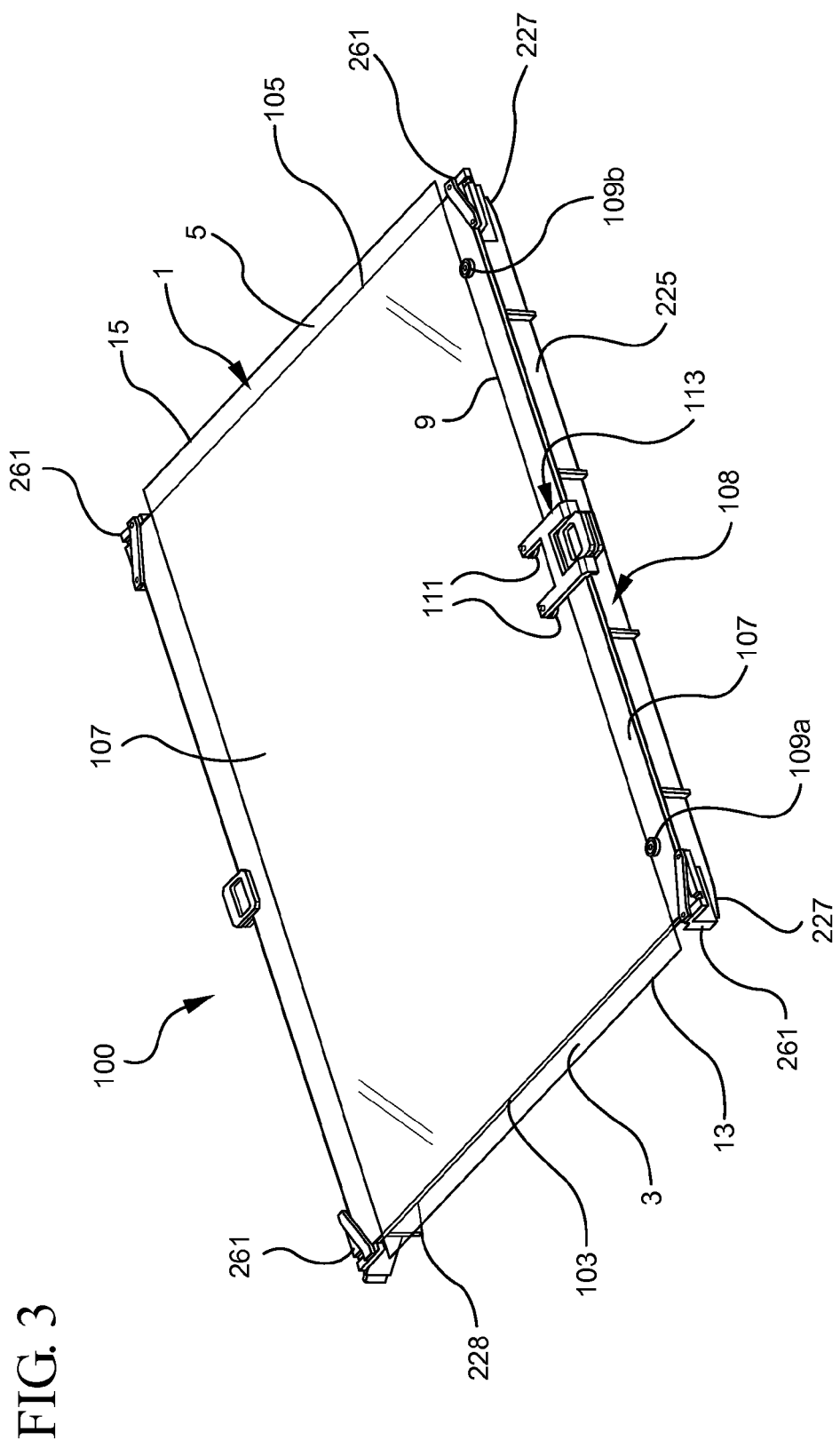
FIG. 3 is a perspective top view of a registration carrier according to an embodiment hereof.

FIG. 3 illustrates a flat, planar glass sheet 1 on a registration carrier 100 according to an embodiment hereof for symmetrically bending opposing side edge portions 3 and 5 of the glass sheet 1, while a central portion 7 of the glass sheet remains flat. The registration carrier 100 is designed for accurately registering/locating the glass sheet 1 on the carrier and retaining the glass sheet in this position on the carrier 100 throughout the glass bending process. The registration carrier may include a mold or stage 107 mounted on a base or frame 108 made of steel having stable thermal and mechanical properties at bending/processing temperatures, for example refractory steel type ASI 310. The glass sheet 1 is precisely placed (registered) on the stage 107, with the side edge portions 3 and 5 of the glass sheet extending an equal distance beyond opposing edges 103 and 105 of a rigid stage 107.

The stage has a precisely formed or machined rigid, substantially non-deformable, inelastic, flat/planar top support surface for supporting the flat, planar central portion 7 of the glass sheet throughout the glass heating and bending process. However, it will be appreciated that the stage may alternatively be curved or bowed to impart a curve or bow in the central portion of the glass sheet or the side portions of the glass sheet. As such, the term "substantially planar" as used herein and in the appended claims is intended to mean planar, as well as slightly curved or bowed, for example a convex or concave curvature in one or more directions having a radius of up to 100 cm. The edges 103 and 105 of the stage may be precisely machined to match the desired curvature or bend of the edge portions 3 and 4 of the glass sheet. Similarly, the edge regions of the top surface of the stage may also be contoured or inclined, e.g. with beveled or curving edge portions, for imparting a desired shape to the edge portions 3 and 5 of the glass sheet. The stage may be formed of a rigid material having a low coefficient of thermal expansion (CTE) in order to provide a stable, non-deformable support surface for the glass sheet in a perfectly known geometrical reference throughout the process. For example, the stage may be formed of a material having a CTE of no more that $10 \times 10^{-6}$ $K^{-1}$, or n more than $6 \times 10^{-6}$ $K^{-1}$ The stage may also be made of various materials having a low thermal expansion that are essentially elastic in the 20° C. to 750° C. range, in order to avoid permanent deformations from developing in the stage. Such deformations may occur if materials such as stainless steel are used, due to the accumulation of thermal gradients upon repeated heating up and cooling of the stage. For example, the stage may be formed of a refractory non-metallic material, such as ceramic, glass-ceramic, silicon carbide (SiC) or other rigid, non-deformable. The stage may be formed of an insulating material, in order to minimize thermal transfer between the glass and the stage. The stage may also be formed with a thickness of no more the 1 cm in order to further minimize the thermal inertia of the stage and minimize the thermal impact of the stage on the glass sheet during processing.

Figure 4:
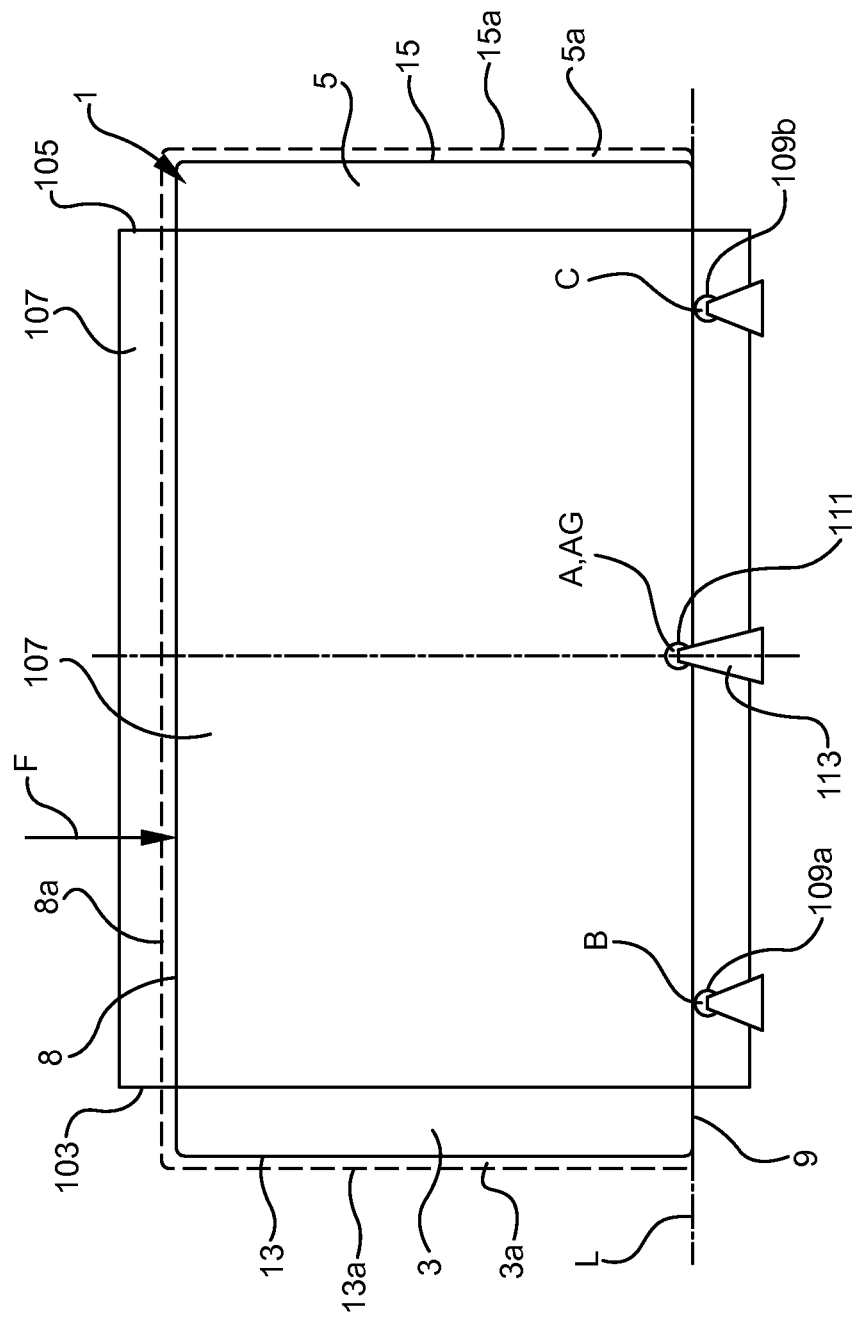
FIG. 4 is an explanatory schematic plan view of the registration carrier of FIG. 3.

The operation of the registration carrier 1 will now be described with reference to FIG. 4, which is an explanatory schematic plan view of the registration carrier 100 of FIG. 3. Registration of the glass sheet 1 in a precise position on the stage 107 is achieved using three reference points A, B, and C on the stage. Reference point A is a fixed reference point located precisely midway between the side edges 103 and 105, e.g. at a location that is an equal distance from both side edges 103 and 105 of the stage. By fixed, it is meant that once the glass sheet is precisely registered on the stage 107, a corresponding reference point AG on the glass sheet, which is precisely located midway between the edges 103 and 105 of the glass sheet, is registered with and fixed relative to reference point A of the registration carrier and does not move relative to the stage 107 throughout the glass heating and bending process. Reference points B and C are non-fixed or moving reference points, which means that corresponding points BG and CG on the glass sheet 1 move relative to reference points B and C on the registration carrier and move relative to the stage 107 as the glass sheet expands during the heating and bending process.

Reference points B and C are defined by registration surfaces or element 109A and 109B that extend upward from the support surface of the stage. The registration elements 109A and 109B may be formed by registration rollers or registration posts formed of silicate aluminates, or other suitable material having suitable mechanical properties and machine ability. The registration rollers or posts are mounted on the stage 107 in precisely positioned holes formed in the stage adjacent a third edge of the stage extending between the first and second edges of the stage. The rollers or posts are precisely positioned on the support surface to precisely define a fixed reference line L perpendicular to the edges 103 and 105 of the stage. Reference point A is defined by a contact surface 111 of a clamp 113. The clamp 113 is precisely positioned relative and affixed to the stage 107 or the frame 108, in order to precisely position the contact surface 111 at reference point A midway between the edges 103 and 105 of the stage 107. The posts or rollers 109A and 109B, the clamp 113 and the contact surfaces 111 may be formed of refractory steel (type ASI 310 for example) or other suitable material. It will be appreciated that the stage 107 may be formed of shapes other than the illustrated rectangular shape and the reference line L may be orientated relative to the edges of the stage at an angle other than a right angle. Moreover, the reference points A, AG (and thee clamp) may not be centered equidistant from each edge 103, 105 of the stage.

In order to precisely locate a glass sheet 1 on the registration carrier 100, the glass sheet 1 is located on the stage 107 of the registration carrier by first precisely registering an edge 9 of the glass sheet with the reference line L on the registration carrier. Next, reference point AG on the glass is precisely registered with reference point A on the registration carrier. In order to register the edge 9 of the glass sheet with the reference line L, first the central portion 7 of the glass sheet 1 is placed flat on the rigid stage 107 of the registration carrier 100, with edge portions 3 and 5 of the glass sheet extending beyond the edges 103 and 105 of the stage 107. The glass sheet 1 is then pushed/translated on the stage toward the rollers 109A and 109B, so that an edge 9 of the glass sheet 1 is pressed against and in contact with the peripheral surfaces of the rollers 109A and 109B. The edge 9 of the glass sheet 1 is now precisely registered with the reference line L defined by the rollers 109A and 109B. Next, the glass sheet is translated to the left or right on the stage as viewed in FIGS. 3 and 4, while retaining the edge 9 of the glass sheet in contact with the rollers 109A and 109B, until reference point AG on the glass sheet is precisely registered with reference point A on the registration carrier. Retaining the edge 9 of the glass sheet in contact with the rollers (or posts) ensures that the edge of the glass sheet remains in precise registration with the reference line L as the glass sheet 1 is moved on the stage 7. Once point AG on the glass sheet is precisely registered with reference point A, then clamp 113 is closed such that the contact surface 111 of the clamp presses down on a top surface of the glass sheet and securely clamps the glass sheet between the contact surface 111 and the stage 107. Reference point AG on the glass sheet is thus securely fixed by the clamp relative to the reference point A and relative to the stage 107. The glass sheet is now precisely located and secured in place on the stage 107 of the registration carrier 100 by rollers 109A and 109B and clamp 113. A biasing force (arrow F) may optionally be applied to an opposing edge 8 of the glass sheet 1 in order to press the edge 9 of the glass sheet against the rollers 9a and 9B and help ensure that the edge 9 of the glass sheet remains in contact with the rollers in registration with reference line L.

It may be important to avoid marring the surface of the glass sheet with the contact surface 111 of the clamp 113, in order to maintain the appearance, optical quality and structural integrity/strength of the glass sheet 1. As illustrated in FIG. 3, the clamp may be forked or bifurcated, such that the contact surface is bifurcated into two separate, spaced apart contact surfaces 111. Several objectives are achieved by bifurcating the contact surface 111 into two parts. First, bifurcating the contact surface into two spaced apart contact surfaces spreads the contact force applied by the clamp over a larger area on the surface of the glass sheet, thereby minimizing the surface deformation of the glass sheet caused by the force applied by the clamp. Second, using two spaced apart, relatively small contact surfaces to spread out the contact force, rather than using a single large contact surface, minimizes the surface area on the glass sheet that is contacted by the clamp.

It is important to minimize the area on the glass sheet that is contacted by the clamp, so that should the surface of the glass sheet be marred by contact with the contact surface of the clamp, any such marring of the surface of the glass is likewise minimized Minimizing the area of contact between the clamp and the glass sheet also minimizes the thermal impact that the clamp has on the glass sheet, which can cause the glass to ripple or bend due to thermal stresses near the contact area. The total surface area of the contact surfaces 111 should be large enough relative the total contact force to prevent permanent marks or deformations on the surface of the glass sheet. Pressure applied by the clamp may be as low as 10 g/cm2, depending on the viscosity of the glass at processing temperatures, in order to prevent marring of the glass. An example of a suitable surface area for the contacting surface relative to a contacting force applied by the clamp is 20 to 50 cm$^2$ in total clamp surface area associated with a 2 to 5 N contacting force. The clamping force may be provided by a fixed dead load (e.g. the weight of or a weight on the clamp), by a closing the clamp with a spring having a set spring force, or closing the clamp pneumatically, or by some other mechanically means with a pressure control. The contact surface 111 may alternatively be formed of a single contact surface or by three or more contact surfaces, rather that the illustrated two contact surfaces 111. The contact surfaces should be close enough together, for example, no further apart than about 50 mm, in order to approximate a single point, namely reference point A.

When the glass sheet 1 is heated from near room temperature to the bending temperature of the glass sheet, the glass sheet expands by up to 10 mm in it's length-wise and width-wise dimensions. The solid lines 8, 9, 13 and 15 in FIG. 4 show the original size of the glass sheet when first precisely locate on the registration carrier 100 as previously described herein. The solid line 9 and dashed lines 8a, 13a and 15a show the expanded size of the glass sheet 1 after the sheet is heated to its bending temperature in the bending oven. The clamp 113 and the rollers 109A and 109B retained the reference point AG on the glass sheet and the edge 9 of the glass sheet in registration with reference point A and reference line L, respectively, on the stage 107. As a result, as the glass sheet is heated and expands, the length of the glass sheet increases equally on both sides of reference point A, AG (e.g. from 13 and 15 to 13a and 15a) and the glass sheet remains precisely symmetrically positioned on the stage 107 with the edge portions 3a and 5a extending beyond the edges of the stage 107 by an equal distance. It will be appreciated that the portions 3, 3a and 5, 5a of the glass sheet may extend beyond the edges of the stage 107 by different distances, such that the glass sheet is not symmetrical after bending, or just a single edge of the glass sheet may bent. In any event, the location of the glass sheet on the stage at the bending temperature (represented in dash lines) can be precisely known and reproducible with a registration carrier as described herein.

As previously described herein, the entire glass sheet 1 may be heated to a bending temperature between the annealing temperature and the softening temperature of the glass sheet in the bending zone 25 in a single heat zone process. Alternatively, the pre-heating zones 23 and the bending zone 25 may be maintained at temperatures that heat the glass sheets in the bending zone to a temperature that is near but below the bending temperature, e.g. below the annealing temperature of the glass. A localized heating device in the bending zone 25 may then heat only the edge portions 3 and 5 of the glass sheet that are to be bent up to the bending temperature. Alternatively, just portions of the glass sheet over the edges 103, 105 of the stage may be heated to the bending temperature, with the outermost edge portions 3, 5 of the glass sheet remaining below the bending temperature of the glass. Keeping the outermost edge portions 3, 5 of and the central portion 7 the glass sheet below the bending temperature assures that these portions of the glass sheet remain flat/planar and only the portions of the glass sheet that are to be bent are heated and bent. In any event, the portions 3a and 5a of the glass sheets to be bent are heated to the bending temperature and bent downward until they conform to the edges 103 and 105 of the stage 107, as schematically illustrated in FIG. 2. The edge portions 3a and 5a of the glass sheets may be bent downward under the force of gravity alone. However, when bending a relatively thin glass sheet, relying on gravity alone to bend the edge portions downward may be unsatisfactorily slow and unreliable due to the light weight of the glass sheet. It may be advantageous to apply a force to the edge portions 3a and 5a of relatively thin glass sheets in order to increase the speed and reliability of the bending process in the bending zone.

When a bending mechanism is employed to apply localized heating and/or an external force to bend the glass sheets, then a locating or registration mechanism may need to be provided to ensure accurate positioning of the bending mechanism relative to the edge portions of the glass sheet, so that the glass sheets are bent with the desired high precision tolerances. The bending mechanism may include a localized heater and/or a force apply device. Localized heaters must be accurately located at the correct position and distance relative to and parallel to the edge portions 3a and 5a of the glass sheet 1, in order to raise the correct portions of the glass sheet to the bending temperature. Failure to heat the correct portions of the glass sheet to the bending temperature could result in failure of the glass sheet to end precisely and evenly, failure of the glass to bend if just gravity is being employed to bend the glass or fracture, or may cause the glass to break if a force applying device (or bending device) is employed. Likewise, the force applying devices must be accurately positioned at the correct distance from and parallel to the edge portions 3a and 5a of the glass sheet, in order to ensure precise bending of the glass sheet.

FIGS. 5 and 6 schematically illustrate an embodiment of a mechanism 200 for precisely locating a localized heating device and/or bending force applying device relative to each edge portion 3a and 5a of the glass sheets 1 in the bending zone 25 of the bending oven. Four arms 210, 211 and 220, 221 extend from outside the bending oven into the bending zone of the bending oven. The arms 220 and 221 on one side of the registration carrier 100 may be spring loaded, for example with springs 265 and 267, or other pneumatic or hydraulic shock absorbing, biasing device. Any suitable moving mechanisms 215, 217, such as, for example, high precision stepper motors, hydraulic cylinders or pneumatic cylinders, are located outside the bending oven for moving the arms toward and way from the registration carrier 100. The moving mechanisms are located outside the bending zone so as to be in a location that is at room temperature, protected from the high bending temperature inside the bending zone 25. Forming tools, such as local heaters 212 and 222 and force applying/force applying devices 214 and 224 may be located on inner ends of the moving arms inside the bending zone 25 of the bending oven. The heaters 211 may be any suitable local heating device, such as radiant heaters. The force applying devices may be any suitable local force application devices, such as mechanical pushers or air nozzles. The heaters and force applying devices may be elongate devices that act on the entire length of the edge portions 3a and 5a of the glass sheet. The elongate heaters 212, 222 and force applying devices 214, 224 are precisely mounted on inner ends of the arms parallel to the edges 103 and 105 of the stage. The arms 210 and 211 may be connected together for synchronized movement toward and away from the stage 107. Similarly, arms 220 and 221 may be connected together for synchronized movement toward and away from the stage 107. The motion of arms 220 and 221 may also be synchronized with the motion of arms 210 and 211. With this construction, the heaters and force applying devices are maintained substantially parallel to the edges of the stage as the heaters and force applying devices are moved toward and away from the stage on the arms.

It will be appreciated that, although FIG. 2 illustrates the edge portion 3 and 5 of the glass sheet as the leading and trailing edges of the glass sheet on the conveyor, it may be advantageous to rotated the registration carrier 100 by 90 degrees compared to FIG. 2 so that the edges 8 and 9 of the glass sheet are the leading and trailing edges of the glass sheet on the conveyor. In this way, the arms 210, 211, 212 and 222 and the moving means 215 and 217 may be located to either side of the conveyor.

Figure 7:
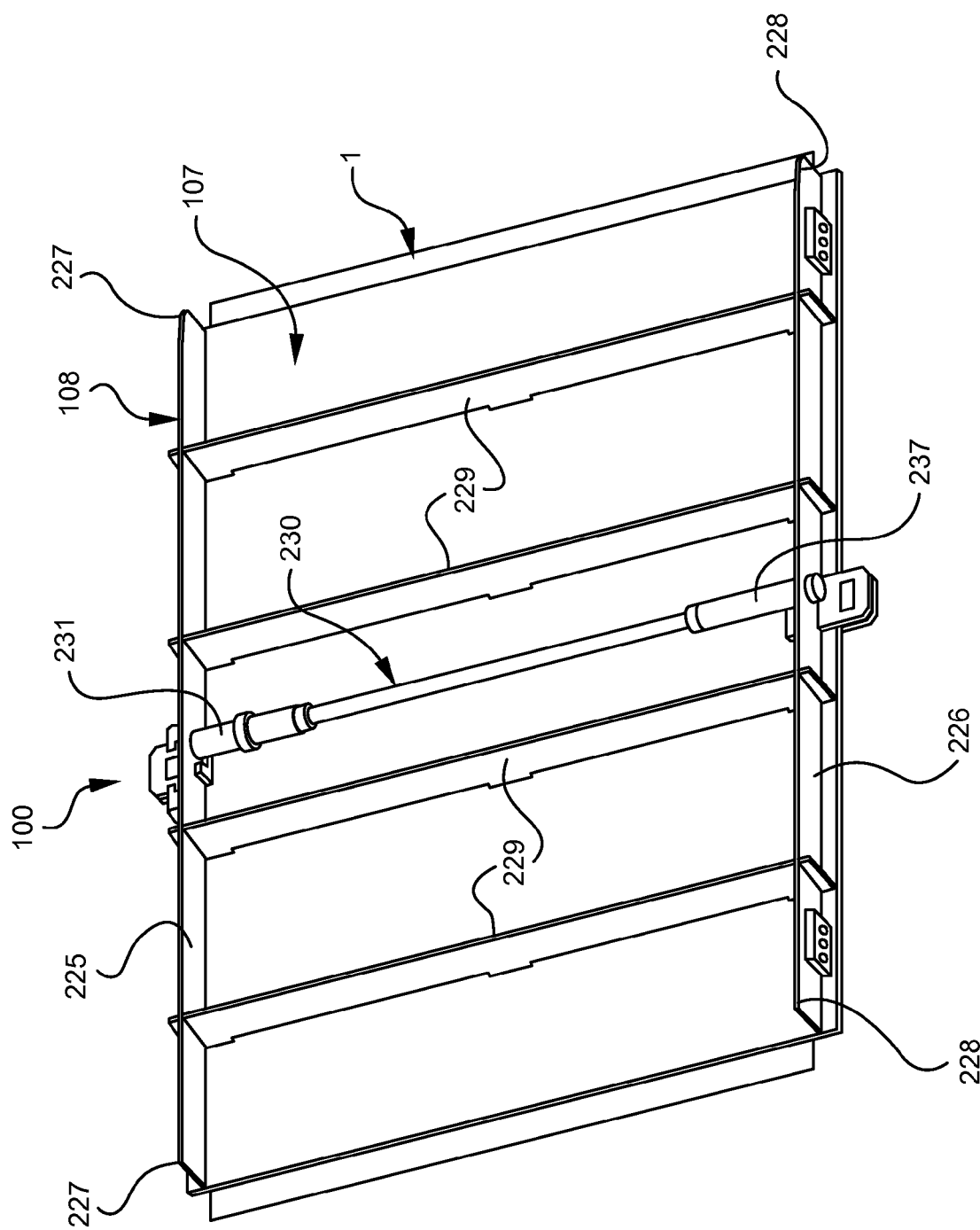
FIG. 7 is a perspective bottom view of the registration carrier of FIG. 3.
Figure 8:
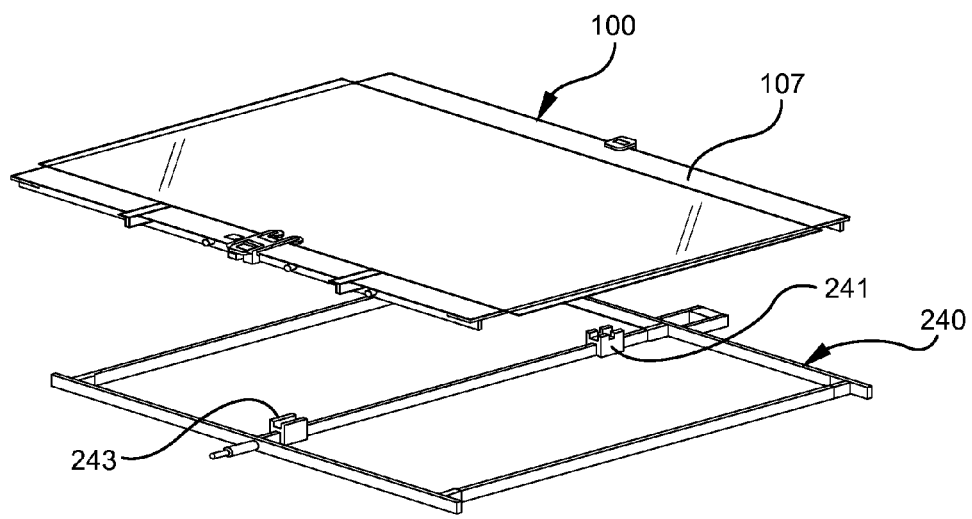
FIG. 8 is a partially exploded perspective view of a conveyor car according to one embodiment hereof and the registration carrier of FIG. 3.

With reference now to FIG. 7, which is a bottom view of the registration carrier 100 showing the construction of the frame 108 of the registration carrier 100 according to one embodiment hereof. The frame 108 includes side rails 225 and 226 connected by cross-rails 229. The lower surfaces of the ends of the side rails are tapered or sloped, forming ramps 227 and 228 on the ends of the side rails. A connecting rod 230 is mounted to the underside of the frame 108. Bearings 231 and 237 are mounted on either end of the connecting rod. As shown in FIG. 8, a conveyor car 240 includes a frame with upward opening forks 241, 243 mounted to the frame. The conveyor car is mounted on the conveyor 11 and the registration carrier is supported on the conveyor car for movement with the conveyor. When the registration carrier 100 is located on the conveyor car, the bearings 231 and 237 on the underside of the frame 108 of the registration carrier are releasably received in the forks 241, 243 on the conveyor car frame, and the registration carrier frame 108 rests on top of the conveyor car frame. The registration carrier is thus mounted on the conveyor car for transport through the bending oven.

Figure 9:
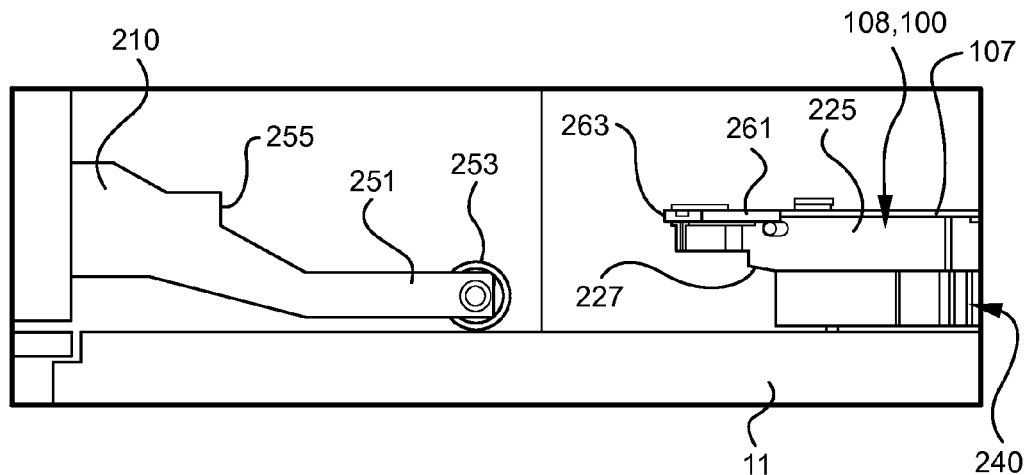
FIGS. 9 through 11 are partial side views of the registration carrier in a bending oven illustrating operation of an embodiment of a heating and bending device positioning mechanism.
Figure 10:
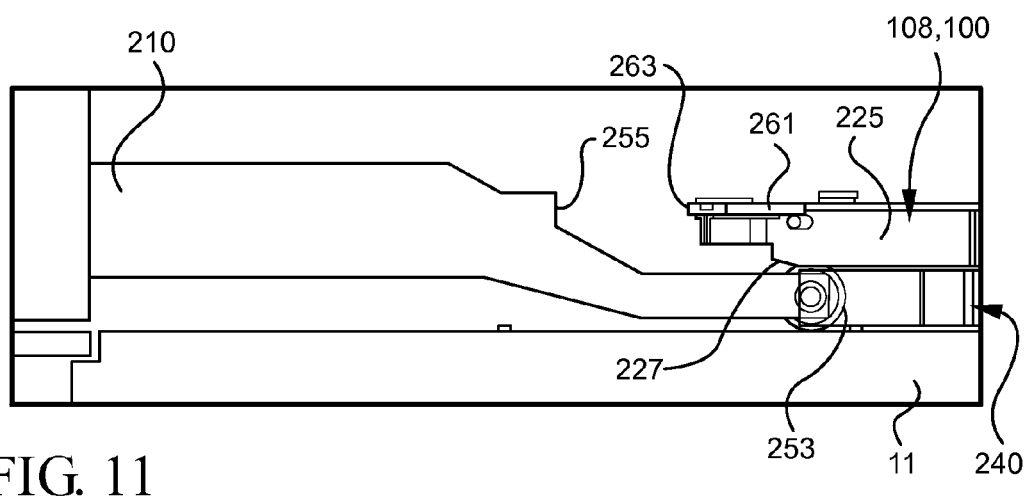
Figure 11:
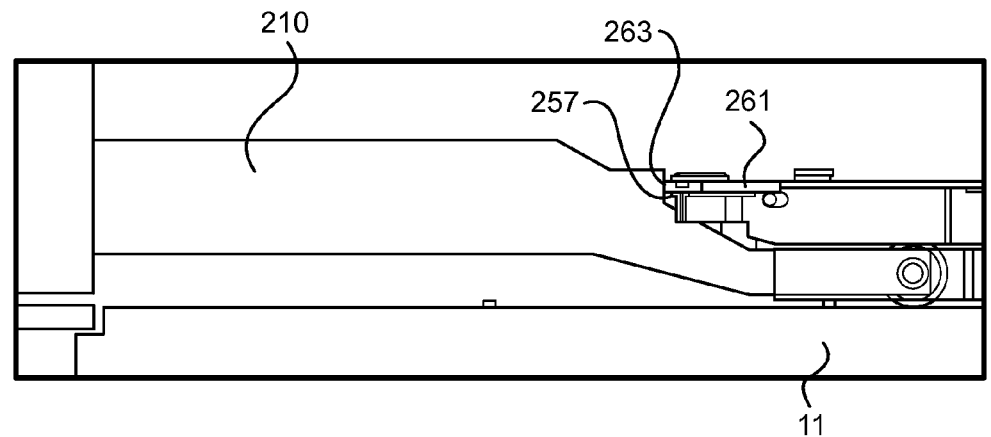

With reference now to FIGS. 9 through 11 (in which the heaters 212 and the force applying devices 214 have been omitted for clarity), the inner ends of the arms 210, 211, 220, 221, only one of which is shown in FIGS. 9 through 11, each include a lift arm 251 with a lift wheel 251 rotationally mounted on the end of the lift arm. A precision stop surface 255 is formed in or provided on each lift arm 251. A metal cap 261 is mounted on each corner of the stage 107 in order to protect the corners of the rigid stage from impacts. The caps 261 each include a precision formed reference surface 263 on the side of the cap facing the corresponding moving arm 210, 211, 220, 221.

As illustrated in sequence on FIGS. 9 through 11, the arms 210, 211 and 220, 221 are retracted as the registration carrier carrying the glass sheet moves into the bending zone 25 of the bending oven. The conveyor is stopped when the caps 261 on the registration carrier are aligned with the arms 210, 211 and 220, 221. The arms 210, 211 and 220, 221 are then moved in toward the registration carrier. As the arms move inward, the lift rollers 253 on the arms contact the ramps 227, 228 on the side mils 225, 226 of the carrier frame 108 and lift the registration carrier frame 108 up off of the conveyor frame 240 as illustrated in FIG. 10. The lift rollers 253 and rails 225, 226 are precisely formed in order to precisely control the height of the stage 107 relative to the ends of he lift arms. The lift rollers contact the lower surfaces of the rails 225 and 226, thereby precisely lifting each corner of the carrier a precise distance relative to the ends of the lift arms. It will be appreciated the rollers 253 may optionally be dispensed with and replaced with an inclined contact or lift surfaces on the ends of the arms.

As the arms 210, 211 and 220, 221 continue to move inward, the stop surfaces (or just stops) 255 on the arms contact the reference surfaces 263 on the caps on the stage as illustrated in FIG. 11. The stop surface gently pushes the carrier until it contacts the stop surface on the opposing arm. As the stops 255 on opposing arms 210-210 and 211-221 both contact the reference surfaces 263 on the corresponding caps 261, the springs 265 and 267 on the arms 220 and 221 are compressed. Each pair of arms 210-210 and 211-221 continue to move inward toward each other until the springs are compressed by a predetermined holding force, for example a force of 5 to 20 Newtons. Once the holding force is reached, the arms are stopped and retain the registration carrier securely clamped between the stop surfaces 263 on each pair of arms during the bending process. At no time is the glass contacted by anything other than the stage 107, the registration rollers 109A and 109B and the clamp 113. The stop surfaces on the arms only contact the caps 261 that protect the corners of the ceramic stage 107. The surface of the glass sheet therefore retains its pristine surface. It will be appreciated that the reference surfaces may be alternatively located on the side rails 225, 226 of the carrier frame 108, rather than on the protective caps on the stage.

The heaters 222 are then activated to heat the portions of the glass sheet to be bent to the bending temperature. Once the portions of the glass sheet to be bent are heated to the bending temperature, then the force applying devices 224 are activated to apply a downward force on the edge portions 3a and 5a of the glass sheet to facilitate bending of the glass sheet in the area of the edges 103 and 105 of the stage 107. After bending, the heaters and the force applying devices are deactivated and the arms 210, 211 and 220, 221 are retracted away from the registration carrier 100. As the lift arms 251 are retracted, the lift rollers 253 move out from under the registration carrier and the registration carrier drops back down into engagement with the conveyor frame, with the bearings 231 and 237 engaged in the forks 241 and 243. The clamp 113 may be opened prior to cooling the formed glass sheet from the bending temperature, in order to remove the contact surfaces 111 from the glass sheet and avoid marring of the glass sheet during cooling and contraction of the glass sheet. The conveyor then moves the registration carrier and the formed/bent glass sheet 1 out of the bending zone and into the cooling zone 27 and out of the bending oven. The shaped and cooled glass sheets are then unloaded from the stage. New flat glass sheets are then loaded onto the vacated stage and the process is repeated.

With the previously described structure, the inner ends of the arms 210-220 and 211-221, and therefore the heaters 222 and the optional force applying device 224 carried on the inner ends of the arms, are precisely located and aligned relative to the edges 103 and 105 of the stage 107 simply by contacting and pressing the stop surfaces 255 on each of the arms against the reference surfaces 263 on each of the caps 261 on the stage 107. By lifting the registration carrier off the conveyor, such that the registration carrier "floats" or rolls/slides on the top of the lift rollers 253, the registration carrier is free to translate and rotate on the lift rollers, such that the registration carrier and the stage "self align" with the ends of the arms when the stop surfaces 255 press against the reference surfaces 263. Since the glass sheet is precisely mounted on the stage, the heaters and force applying devices are also precisely located relative to and aligned with the glass sheet.

This contact between the stop surfaces 255 on the arms and the reference surfaces 263 on the caps is maintained by the spring loaded pressure (for example 5 to 20 Newtons) applied by the arms against the caps. This structure allows for simple and automatic vertical, lateral and angular positioning of the stage 107 and glass 1 relative to the heating and force applying devices on the arms. There is no need for expensive, hard to program controllers, stepper motors or position sensors in order to precisely align the heaters and the force applying devices with the glass sheet on the registration carrier.

Figure 12:
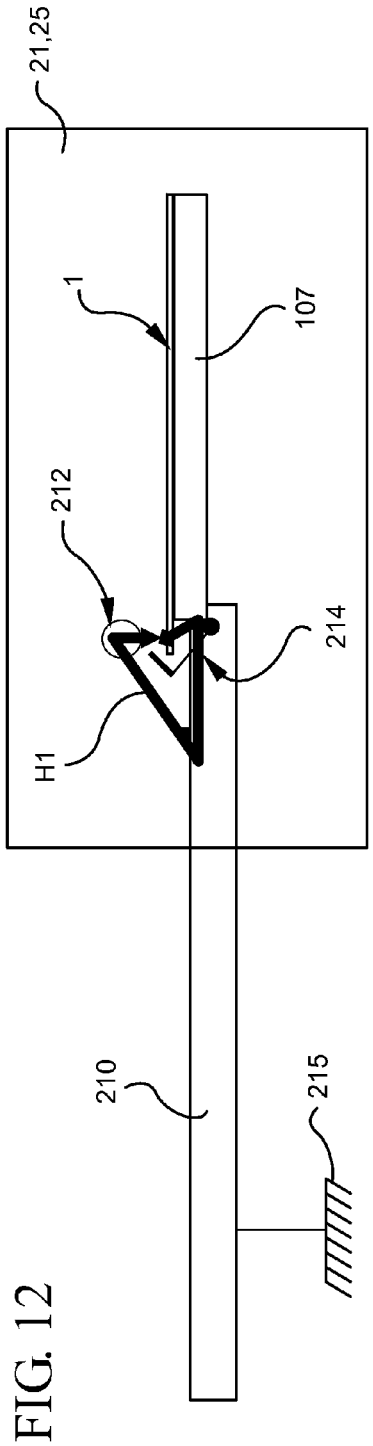
FIG. 12 is a schematic illustration of the effects of thermal expansion on a system as shown in FIG. 7 through 11.
Figure 13:
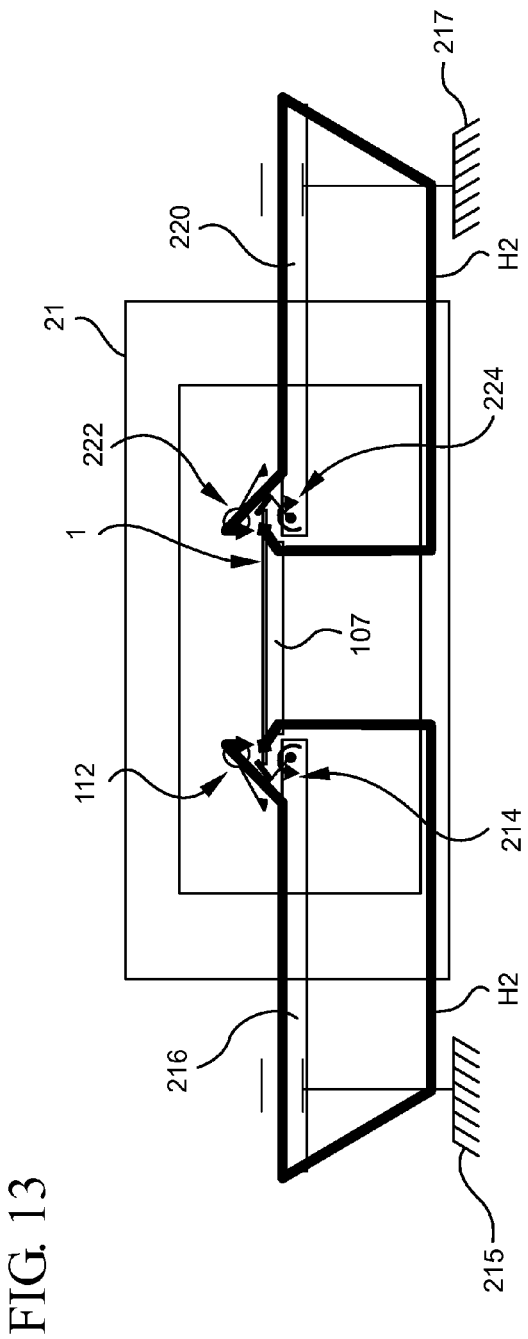
FIG. 13 is a schematic illustration of the effects of thermal expansion on a system not constructed as shown in FIGS. 7 through 11.

Locating the stop surfaces 255 on the arms closely adjacent to the heaters and the force applying devices on the arms minimizes the effect of thermal expansion of the arms on the position of the heaters and the force applying devices. As schematically illustrated in FIG. 12, the thermal expansion of just the mechanical elements between the stop surfaces on the arms and the operative portions of the heater and the force applying devices, e.g. the portions indicated by arrow $H_1$ in FIG. 12, effects the position of the heaters and force applying devices relative to the stage and the glass sheet 1. Should any other portions of the arm 210, the conveyor, the bending oven 21 or floor thermally expand, it will have no effect on the position of the heaters and force applying devices relative to the stage 107. In an arrangement where the position of the heaters and force applying devices relative to the stage and the glass sheet is controlled by moving mechanisms 215, 217 located outside the bending oven 21, then the thermal expansion the bending oven 21, the floor, the moving mechanisms 215, 217, and virtually the entire length of the arms 210, 220, as indicted by arrows $H_2$ in FIG. 13, will haven an effect on the position of the heaters 112, 222 and the force applying devices 114, 224. As such the heaters and the force applying devices should be mounted to the arms as close as possible to the stop surfaces on the arms in order to minimize the effects of thermal expansion on their positioning relative to the glass sheet on the stage.

The system and structures described herein provide for reliable and precise bending of relatively large sheets of relatively high CTE of glass, as well as of relatively thin, relatively large sheets of relatively high CTE of glass. With this construction the heaters and the force applying devices may be precisely located relative to the stage and the glass sheet with an accuracy within tenths of a millimeter, e.g. +/−0.03 mm.

According the further embodiments hereof, the systems and processes described and claimed herein may be employed to bend more than one glass sheet on a carrier at a time. For example, the stage may be equipped with 2 to 4 pairs of registration elements 109A and 109B and 2 to 4 clamps 113, in order to precisely locate and secure 2 to 4 sheets of glass on the stage for precise bending of 1 or 2 edges of each of the 2 to 4 glass sheets in the bending oven at substantially the same time. Additional pairs of arms and bending mechanisms as described herein may be provided in the oven as needed for bending 2-4 glass sheets.

What is claimed is:

1. A method of precisely bending at least one edge portion of a glass sheet in a bending oven comprising:

locating a glass sheet on a support surface of a stage having a first edge and an opposing second edge, with a first edge portion of the glass sheet extending beyond the first edge of the stage, the first edge of the stage having a pair of spaced outward facing first reference surfaces located thereon;

providing a pair of first arms having inner ends extending into a bending oven from a first side of the oven, an elongate first bending mechanism mounted near inner ends of the first pair of arms for bending a first edge portion of a glass sheet on the stage down over the first edge of the stage, the inner end of each first arm having inward facing first stop surfaces in opposition to a respective first reference surface;

a pair of second arms having inner ends extending into the oven from a second side of the oven, the inner end of each second arm having an inward facing second stop surface in opposition to the second edge of the stage;

locating the stage with the glass sheet supported thereon in the bending oven and heating the glass sheet to a processing temperature between the annealing temperature and the softening temperature of the glass sheet; and moving the first arms and moving the second arms inward toward the stage until the first stop surfaces contact the first reference surfaces and the second stop surfaces contact the second edge of the stage, whereby the stage is held between the first stop surfaces and the second stop surfaces with the first edge of stage and the first edge portion of the glass sheet is precisely located relative to and aligned with the first bending mechanism; and bending the edge of the glass sheet with the first bending mechanism.

2. A method as in claim 1, further comprising:

providing pair of spaced first lift arms extending inward from the first stop surfaces and a pair of spaced second lift arms extending inward from the second stop surfaces; and moving the first arms and moving the second arms inward toward the stage until the first stop surfaces contact the first reference surfaces and the second stop surfaces contact the second edge of the stage, whereby the lift arms engage an under-side of the stage and lift the stage such that the stage is resting on the lift arms and the stage is free to translate and rotate on the lift arms, whereby as the first stop surfaces contact the first reference surfaces and the second stop surfaces contact the second edge of the stage translates and rotates on the lift arms until all of the first stop surfaces are contacting the first reference surfaces and all of the second stop surfaces are contacting the second edge of the stage, whereby the first edge of the stage and the first edge of the glass sheet are precisely located relative to and aligned with the first bending mechanism.

3. A method as in claim 1, further comprising:

locating a glass sheet on a support surface of a stage having a first edge and an opposing second edge, with a first edge portion of the glass sheet extending beyond the first edge of the stage and a second edge portion of the glass sheet extending beyond the second edge of the stage, the first edge of the stage having a pair of spaced outward facing first reference surfaces and the second edge of the stage having a pair of spaced outward facing second reference surfaces located thereon;

providing a pair of second arms having inner ends extending into the oven from a second side of the oven, an elongate second bending mechanism mounted near inner ends of the second pair of arms for bending a second edge portion of a glass sheet on the stage down over the second edge of the stage, the inner end of each second arm having an inward facing second stop surface; and moving the first arms and second arms inward toward the stage until the first stop surfaces contact the first reference surfaces and the second stop surfaces contact the second reference surfaces, whereby the stage is held between the first stop surfaces and the second stop surfaces with the first edge of stage and the first edge portion of the glass sheet precisely located relative to and aligned with the first bending mechanism, and the second edge of stage and the second edge portion of the glass sheet precisely located relative to and aligned with the second bending mechanism.

4. A method as in claim 1, wherein:

the stage further comprises a third edge extending between the first edge of the stage and the second edge of the stage; and providing a first registration point and a second registration point on the stage adjacent to the third edge of the stage, such that registration point and a second registration point define a reference line oriented at a desired orientation with respect to the first edge of the stage whereby; and locating the glass sheet on the stage with a reference edge of the glass sheet aligned with both the registration point and the second registration point, whereby the first edge portion of the glass sheet is aligned with the first edge of the stage.

5. A method as in claim 4, further comprising:

providing a third registration point on the stage;

locating the glass sheet on the stage with a reference edge of the glass sheet aligned with both the first registration point and the second registration point, and the reference point of the glass aligned with the third registration point on the glass, whereby, the glass sheet is precisely located and secured in place on the stage with the first edge portion of the glass sheet aligned with and extending a first desired distance beyond the first edge of the stage and the second edge portion of the glass sheet aligned with and extending a second desired distance beyond the second edge of the stage; and clamping the glass against the stage at the third reference point.

6. A method as in claim 3, wherein the first bending mechanism and second bending mechanism each include a biasing apparatus for pushing and bending the corresponding first edge portion of the glass sheet and the second edge portion of the glass sheet down over a corresponding one of the first edge of the stage and a second edge of the stage.

7. A method as in claim 6, wherein the first bending mechanism and second bending mechanism each include a local heating apparatus for heating the corresponding first edge portion of the glass sheet and the second edge portion of the glass sheet to the processing temperature.

8. A method as in claim 3, wherein the first bending mechanism and second bending mechanism each include a local heating apparatus for heating the corresponding first edge portion of the glass sheet and the second edge portion of the glass sheet to the processing temperature.

9. A method as in claim 3, further comprising:

providing pair of spaced first lift arms extending inward from the first stop surfaces and a pair of spaced second lift arms extending inward from the second stop surfaces; and moving the first arms and moving the second arms inward toward the stage until the first stop surfaces contact the first reference surfaces and the second stop surfaces contact the second edge of the stage, whereby the lift arms engage an under-side of the stage and lift the stage such that the stage is resting on the lift arms and the stage is free to translate and rotate on the lift arms, whereby as the first stop surfaces contact the first reference surfaces and the second stop surfaces contact the second edge of the stage translates and rotates on the lift arms until all of the first stop surfaces are contacting the first reference surfaces and all of the second stop surfaces are contacting the second edge of the stage, whereby the first edge of the stage and the first edge of the glass sheet are precisely located relative to and aligned with the first bending mechanism and the second edge of the stage and the second edge of the glass sheet are precisely located relative to and aligned with the second bending mechanism.

10. A method as in claim 3, wherein the glass sheet being bent meets the following criteria: $CTE \times D \times \Delta T \geq 2 \times ST$, where CTE is the coefficient of thermal expansion of the glass sheet, D is the largest dimension of the glass sheet, $\Delta T$ is the change in temperature of the glass sheet during bending of the glass sheet, and ST is the specified tolerance for the bent glass sheet.

* * * * *